(12) United States Patent
Wei et al.

(10) Patent No.: US 11,755,510 B2
(45) Date of Patent: Sep. 12, 2023

(54) DATA DETECTION AND DEVICE OPTIMIZATION

(75) Inventors: Bo Wei, Singapore (SG); Tse Jen Lee, Singapore (SG); Steven TianChye Cheok, Singapore (SG); Jian Qiang, Singapore (SG)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 13/291,894

(22) Filed: Nov. 8, 2011

(65) Prior Publication Data

US 2013/0117475 A1 May 9, 2013

(51) Int. Cl.
*G06F 13/14* (2006.01)
*G06F 13/16* (2006.01)

(52) U.S. Cl.
CPC .......... *G06F 13/1694* (2013.01); *Y02D 10/00* (2018.01)

(58) Field of Classification Search
CPC .............................. G06F 13/1694; Y02D 10/00
USPC ....................................................... 710/11, 33
See application file for complete search history.

(56) References Cited

U.S. PATENT DOCUMENTS

| | | | |
|---|---|---|---|
| 5,343,515 A * | 8/1994 | Treffkorn | H04M 11/06 375/222 |
| 5,754,890 A | 5/1998 | Holmdahl et al. | |
| 5,828,905 A | 10/1998 | Rao | |
| 5,832,244 A | 11/1998 | Jolly et al. | |
| 5,928,347 A | 7/1999 | Jones | |
| 5,935,224 A | 8/1999 | Svancarek et al. | |
| 6,006,295 A | 12/1999 | Jones et al. | |
| 6,012,103 A | 11/2000 | Sartore et al. | |
| 6,151,647 A | 11/2000 | Sarat | |
| 6,442,734 B1 | 8/2002 | Hanson et al. | |
| 6,460,094 B1 | 10/2002 | Hason et al. | |
| 6,625,790 B1 | 9/2003 | Casebolt et al. | |
| 6,687,765 B2 * | 2/2004 | Surugucchi et al. | ........... 710/15 |
| 6,687,775 B1 | 2/2004 | Bassett | |
| 6,813,662 B2 | 11/2004 | Park | |
| 6,886,052 B2 | 4/2005 | Chiu et al. | |
| 6,892,249 B1 * | 5/2005 | Codilian | ................ G11B 20/18 710/5 |
| 6,898,980 B2 | 5/2005 | Behm et al. | |
| 7,007,117 B2 | 2/2006 | Henrie et al. | |
| 7,096,435 B2 | 8/2006 | Hanson et al. | |
| 7,277,966 B2 | 10/2007 | Hanson et al. | |
| 7,380,145 B2 | 5/2008 | Albulet | |
| 7,415,546 B2 | 8/2008 | Liu et al. | |
| 7,421,523 B2 | 9/2008 | Estakhri et al. | |
| 7,509,444 B2 | 3/2009 | Chiu et al. | |
| 7,565,699 B2 | 7/2009 | Gonsalves et al. | |
| 7,599,293 B1 | 10/2009 | Bain et al. | |
| 7,653,123 B1 | 1/2010 | Woodings | |
| 7,721,017 B2 | 5/2010 | Estakhri et al. | |

(Continued)

*Primary Examiner* — Ilwoo Park
(74) *Attorney, Agent, or Firm* — Christian W. Best (57) ABSTRACT

The disclosure is related to systems and methods for data detection and device optimization. In one example, a device may include an interface circuit for data transmission, and an interface detection module adapted to determine a characteristic of a data transfer over the interface circuit. The device may implement an optimization profile for the device based upon the determined characteristic. Further, a device may be configured to measure a data transfer rate, determine an interface type based on the data transfer rate, and implement an optimization profile based on the interface type. The optimization profile may optimize a system for power consumption, performance, or other benefits.

19 Claims, 4 Drawing Sheets

(56) References Cited

U.S. PATENT DOCUMENTS

| | | | |
|---|---|---|---|
| 7,729,459 B1 | 6/2010 | Kang et al. | |
| 7,733,595 B2 | 6/2010 | Lucas et al. | |
| 7,761,927 B2 | 7/2010 | Reckless et al. | |
| 7,779,171 B2 | 8/2010 | Hanson et al. | |
| 7,809,866 B2 | 10/2010 | Liu et al. | |
| 7,818,479 B2 | 10/2010 | Takeuchi et al. | |
| 7,882,504 B2 | 2/2011 | Klingman | |
| 7,895,394 B2 | 2/2011 | Nakajima et al. | |
| 7,919,982 B1 | 4/2011 | Chen et al. | |
| 7,921,233 B2 | 4/2011 | Chung | |
| 7,925,795 B2 | 4/2011 | Tamir et al. | |
| 7,930,007 B2 | 4/2011 | Andreasson | |
| 7,930,644 B2 | 4/2011 | Silva et al. | |
| 2004/0076117 A1* | 4/2004 | Madapushi et al. | 370/230.1 |
| 2005/0182847 A1* | 8/2005 | Jawad Pirzada et al. | 709/233 |
| 2005/0254433 A1* | 11/2005 | Tsukizawa | 370/241 |
| 2008/0024903 A1* | 1/2008 | Hiratsuka | G11B 33/12 360/73.03 |
| 2008/0084823 A1* | 4/2008 | Akasaka et al. | 370/235 |
| 2008/0212663 A1* | 9/2008 | Lochner | 375/225 |
| 2008/0219083 A1* | 9/2008 | Chang | G06F 1/3225 365/233.1 |
| 2008/0313396 A1* | 12/2008 | Feldman | G06F 3/061 711/112 |
| 2010/0161842 A1* | 6/2010 | Shan | G06F 1/3209 710/18 |
| 2011/0116185 A1* | 5/2011 | Katagiri | G11B 15/1875 360/73.04 |
| 2012/0102244 A1* | 4/2012 | Shiraishi | 710/63 |
| 2012/0290784 A1* | 11/2012 | Katagiri | G11B 15/32 711/111 |
| 2016/0371018 A1* | 12/2016 | Heo | G06F 3/061 |

* cited by examiner

DATA DETECTION AND DEVICE OPTIMIZATION

SUMMARY

A device may comprise an interface circuit for data transmission and an interface detection module (IDM). The interface detection module may be adapted to determine a characteristic of a data transfer over the interface circuit, and implement an optimization profile for the device based on the characteristic.

In another embodiment, a device may comprise a circuit configured to detect a characteristic of a data transfer, and select an optimization profile based on the characteristic.

In yet another embodiment, a method may include determining a characteristic of a data transfer over an interface, and implementing an optimization profile for a data storage device based on the characteristic.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

A device may comprise an interface circuit for data transmission, and an interface detection module (IDM). The interface circuit may be adapted to communicate via multiple interface protocols to transmit or receive data. The IDM may be adapted to determine a characteristic of a data transfer over the interface circuit, and implement an optimization profile for the device based on the characteristic. The IDM may dynamically determine the characteristic, and update the optimization profile by selecting or modifying the current optimization profile based on changes to the characteristic. The device may comprise a data storage device with a memory and an interface connector that is connectable to a host computer.

As an example, the characteristic may be a data throughput rate, which the IDM may determine based on a data transferred value and a time elapsed value. The IDM may be adapted to determine the data throughput rate when the data transfer exhibits an approximately consistent data transfer speed. The data throughput rate may be calculated by dividing the data transferred value by the time elapsed value.

The IDM may be further adapted to determine an interface type based on a comparison of the characteristic to values for interface protocols. For example, if the characteristic is a data throughput rate, the IDM may compare the detected data throughput rate to ranges of data rates for interface protocols. With throughput measurement and profiling, a device can detect the interface that it is connected to, and adopt an optimized operating mode. The IDM may implement the optimization profile based on the interface type.

The optimization profile selected or implemented may include one or more different operating modes for the device or for a system including the device. These operating modes may include operating at full speed or power, or may include optimizing power consumption, optimizing memory access speed, optimizing memory access retry and error recovery, optimizing memory reliability, or optimizing a memory caching scheme. The device may select an optimization profile that includes one or more of these operating modes to improve performance or reliability based on the characteristic determined by the IDM. For example, if the IDM detects a slow data throughput rate, the optimization profile may include running the device slower to reduce noise and energy consumption while still transmitting or receiving data at the data transfer's maximum data transfer rate.

In another embodiment, a device may comprise a circuit configured to detect a characteristic of a data transfer, and select an optimization profile based on the characteristic. The circuit may dynamically determine the characteristic and update the optimization profile by selecting or modifying the current optimization profile based on changes to the characteristic. The characteristic may be a data throughput rate for the data transfer, and the circuit may be further configured to determine the data throughput rate based on a data quantity value and a time elapsed value for the data transfer. The circuit may be further configured to determine an interface type based on the characteristic, and select an optimization profile based on the interface type. The interface type may be determined by comparing the characteristic to values for interface protocols.

Another embodiment may be a method comprising determining a characteristic of a data transfer over an interface, and implementing an optimization profile for a data storage device based on the characteristic. The method may further comprise dynamically determining the characteristic and adjusting the optimization profile based on changes to the characteristic. The characteristic may be a data throughput rate, which can be determined based on an amount of data transferred over a time period. The method may further comprise verifying that the data transfer is characterized by an approximately steady speed. The method may include determining an interface type based on the data throughput rate, and implementing the optimization profile based on the interface type. The interface type may be determined by comparing the data throughput rate to pre-determined ranges of rates associated with interface protocols.

Figure 1:
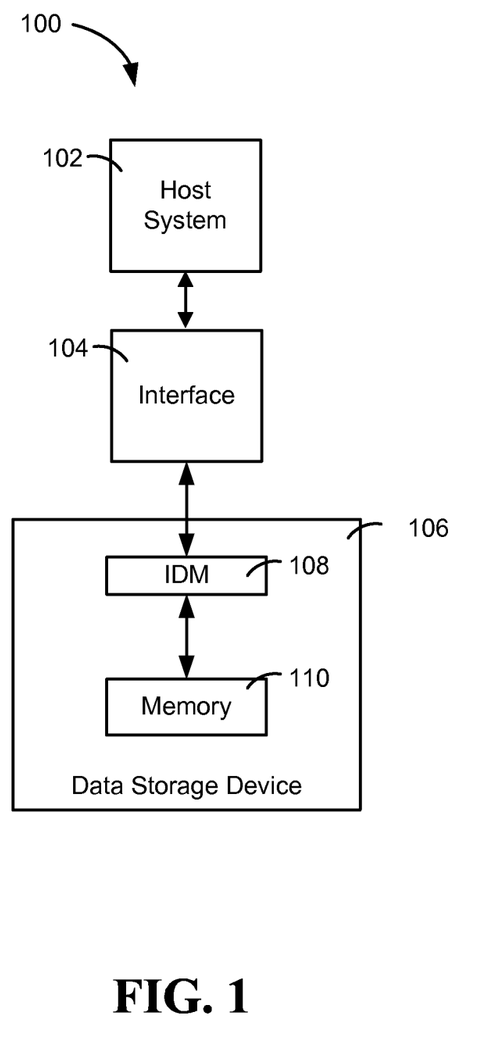
FIG. 1 is a diagram of an illustrative embodiment of a system for data detection and device optimization.

Referring to FIG. 1, an embodiment of a system for data detection and device optimization is shown and generally designated 100. This system 100 can include a host system 102, an interface 104, and a data storage device 106. The system 100 can represent any system where data may be transferred between two devices via an interface. The host system 102 can be a desktop computer, a laptop computer, a server, a personal digital assistant (PDA), a telephone, a music player, another electronic device, or any combination thereof. Similarly, the data storage device 106 may be any of the above-listed devices; any other device containing a memory such as a disk drive, a flash drive, a memory card, or a hard drive; or any device which can transmit or receive data over an interface. The host system 102 may also be referred to as the host or host computer. The host 102 may transmit data to or receive data from the data storage device 106 across the interface 104.

The interface 104 may transfer data between the host 102 and the data storage device 106. The interface 104 can be any type of interface capable of transmitting data between devices. The interface 104 may be in the form of a computer bus interface standard or other interface protocol for transferring data between systems or components, such as USB 2.0, USB 3.0, IEEE 1394, Compact Flash, SATA, eSATA, PATA, SCSI, SAS, Fiber Channel, PS/2, serial cable, HDMI, or Ethernet. Other embodiments of the interface 104 may include wireless interfaces, such as IEEE 802.11 protocols, Bluetooth, infrared, cellular, or satellite mobile telecommunication protocols. Hardware necessary to implement the interface 104 may be added to the host 102 and the data storage device 106.

The data storage device 106 as depicted in the embodiment of FIG. 1 may contain a memory 110 and an Interface Detection Module (IDM) 108. The memory 110 can be any form of volatile or non-volatile memory capable of storing data, such as flash memory, ROM, RAM, DRAM, SRAM, Solid-State Drive (SSD), HDD, or any combination thereof. Data can be transferred between memory 110 and the host 102 by way of the interface 104. The IDM 108 can monitor data transfers to or from the memory 110. An IDM 108 can be situated to monitor data transfers between the data storage device 106 and the host 102, and detect a characteristic of the data transfer. The IDM 108 may be software, a programmable controller, a circuit, a CPU, or any device or combination of elements capable of receiving and processing information about the data transmission.

Data transfers between the data storage device 106 and the host system 102 may exhibit characteristics based on the data storage device 106 or the host system 102. Data transfers may also exhibit characteristics based on the interface 104, on outside influences such as interference to communication signals, or on the transferred data itself.

An example of a characteristic of a data transfer may be a data throughput rate, which can indicate a measure of how quickly data is transferred between the host 102 and the data storage device 106. Other possible characteristics may include whether a data transfer involves a serial communication or parallel communication, an actual or projected size of a data transfer, an actual or projected time of a data transfer, a wireless signal strength, or whether the data transfer involves a sequential data transfer, such as a serial read or a serial write to memory. The ability to detect a characteristic of a data transfer may allow for an improvement in overall performance of the system 100 or in one or more elements of the system 100.

As an example, a characteristic the IDM 108 is adapted to detect may be the data throughput rate of a data transfer between a host system 102 and a data storage device 106. A maximum data throughput rate may be limited by the interface 104, if the interface protocol has a lower maximum transfer rate than that host 102 or the data storage device 106 are capable of. For example, a USB 2.0 interface may only support transfer speeds of up to 26 MB/s, while a host 102 and a data storage device 106 may be capable of sequential read or sequential write speeds in excess of 100 MB/s. In this example, the data throughput rate may be limited by the slower interface protocol.

A data throughput rate may also be determined by the speed of the host system 102 or the data storage device 106. For example, a first generation SATA interface may communicate at a rate of 1.5 Gbit/s, while a host or a data storage device may only be capable of sequential read or sequential write speeds of 100 MB/s. In this example, the data throughput rate may be limited by the slower host 102 or data storage device 106, rather than by the interface 104.

A data storage device 106 or a host 102 may be designed to operate at maximum speed unhindered by the characteristics of data transfers to or from the data storage device 106 or the host 102. For example, a data storage device 106 may operate at a maximum speed despite a data throughput rate being restricted by a slower interface 104. Thus, by detecting a characteristic of a data transfer, the IDM 108 could modify operations based on the characteristic, which may optimize the system 100 to operate more efficiently.

An IDM 108 may analyze a data transfer to detect characteristics of the data transfer. In some embodiments, the IDM 108 may determine whether a data transfer is occurring at an approximately consistent speed. An approximately consistent speed may indicate or result from a sequential read or sequential write, which may result in a more consistent data throughput rate. An approximately consistent data transfer speed may allow for more accurate detection of some characteristics, such as a data throughput rate. When a data transfer is not occurring at a consistent speed, the IDM 108 may end the analysis.

In some embodiments, a determination of a characteristic, such as a data throughput rate, may be initiated or repeated according to a variety of factors, such as a set length of time, when a new interface is connected, user-initiated, upon detection of a new data transfer, at power down or power up, according to instructions from a host or other device, at random intervals, after a pre-determined quantity of data has been transferred, or any combination thereof.

The IDM 108 may monitor a data transfer and determine a data transferred value and a time elapsed value. A data transferred value may be a quantity of data transferred during a measured data transfer. A time elapsed value may be an amount of time elapsed during a measured data transfer. A data transferred value and a time elapsed value can include the quantity of data transferred and the time elapsed from a beginning of the data transfer, or from a selected point, such as when an approximately consistent transfer rate is detected. In some embodiments, a data transferred value may be a quantity of data transferred over a pre-determined period of time. In some embodiments, a time elapsed value may be a length of time required to transfer a pre-determined quantity of data. A data transferred value and a time elapsed value may be dynamically updated by the IDM 108, such as by replacing said values with new measurements, or by adding to said values to incorporate a larger data sample size.

An IDM 108 may calculate a data throughput rate using a data transferred value and a time elapsed value. In some embodiments, a data throughput rate may be calculated by determining, data throughput rate=data transferred value/time elapsed value, utilizing measured or pre-determined values. A data throughput rate may be determined after a pre-determined quantity of data is transferred or a pre-determined length of time has elapsed in the measured data transfer. For example, the IDM 108 may determine a data throughput rate after 10 MB of data has been transferred. As another example, the IDM 108 may determine the data throughput rate after one second of data transfer has elapsed. In another embodiment, the data throughput rate may be calculated and updated dynamically. As an example, the IDM 108 may update the data throughput rate after every 100 MB of transferred data.

Once a characteristic of a data transfer is determined, the IDM 108 may determine an interface type by comparing the characteristic to characteristics for different interface protocols. For example, a data throughput rate may be compared to ranges of data throughput rates for various interface protocols. As a further example using data throughput rate, USB 3.0 may have a data throughput range of 35 MB/s to 100 MB/s, while a USB 2.0 may have a data throughput range from 19 MB/s to 26 MB/s. By comparing the calculated data throughput rate of the measured data transfer to the throughput profiles of interface types, the interface type used in the data transfer, or its equivalent, may be determined. For example, if there is no data throughput profile for an interface type used in a data transfer, the IDM 108 may determine what interface type has the nearest equivalent data throughput profile. This way a variety of different interface protocols may be used to communicate between the host 102 and data storage device 106, and the IDM 108 can determine the interface type and automatically implement optimizations based on characteristics of the interface type.

After determining the characteristic of the data transfer, the IDM 108 may select and implement an optimization profile based on the characteristic. In some embodiments, an optimization profile may be selected based upon a determined interface protocol. An optimization profile may include a set of operating modes for the data storage device 106, the host system 102, or the system 100 generally. For example, a data storage device 106 may have a number of operating modes, e.g.: normal operation at full speed; optimizing power consumption by reducing processing speed; reducing seek speed to lower noise and increase accuracy; performing more retries; improving reliability by performing more read-after-write verification; performing more frequent diagnostics with Directed Offline Scans (DOS); or adjusting the caching scheme to suit transfer speeds. These are only examples, and other operating modes may be considered. An optimization profile may be a collection of one or more operating modes.

The IDM 108 may select an optimization profile, e.g. an operating mode or set of operating modes, based upon the determined characteristic. Once an optimization profile is selected, it may be implemented to improve performance. The optimization profile may be tailored to achieve improved performance in the system 100 or an aspect or part of the system 100 according to the characteristic.

In some examples, the IDM 108 may be in a data storage device 106 and may detect a slow interface 104. The IDM 108 may then select and implement an optimization profile that improves the performance of the data storage device 106, such as reducing power consumption and increasing the amount of read-after-write verifications performed by the data storage device 106. The optimization may be accomplished while data is still being transmitted at the maximum rate allowed by the interface 104. The host 102 may not detect or be aware of any change in the performance of the data storage device 106 as a result of the optimizations. In another embodiment, the IDM 108 may transmit a determined characteristic or an optimization profile to the host system 102 to improve the performance of other parts of the system 100.

Determining a data throughput rate or interface type can also be helpful to regulate a data transfer itself. For example, sometimes artificial delays may be added to certain regions of a data storage device 106 to regulate the throughput; however, such delays may be unnecessary when a slow host 102 or interface 104 is detected, because the data storage device 106 can implement more optimal methods of regulating throughput.

Figure 2:
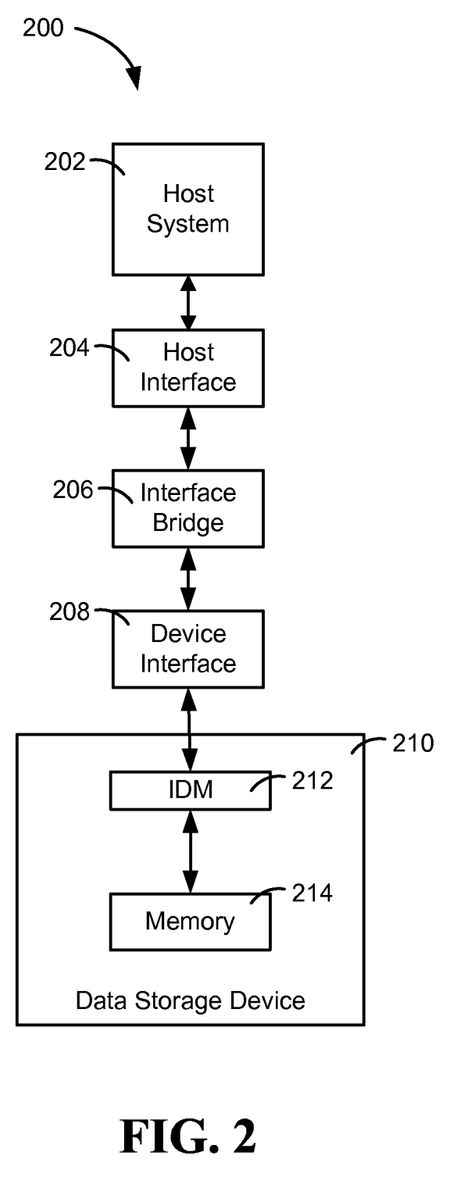
FIG. 2 is a diagram of another illustrative embodiment of a system for data detection and device optimization.

Referring to FIG. 2, an embodiment of a system for data detection and device optimization is shown and generally designated 200. The system 200 may include a host system 202, a host interface 204, an interface bridge 206, a device interface 208, and a data storage device 210. The host system 202 can be a desktop computer, a laptop computer, a server, a personal digital assistant (PDA), a telephone, a music player, another electronic device, or any combination thereof. Similarly, the data storage device 210 may be any of the above-listed devices, or any device which can transmit or receive data over an interface. For example, the data storage device 210 may be a disk drive, a flash drive, a memory card, a hard drive, or any combination thereof. The host system 202 may also be referred to as a host or host computer. In the system 200, the host 202 may transmit data to or receive data from the data storage device 210.

In a particular embodiment, data may be transferred between the host 202 and the data storage device 210 by way of the host interface 204, the interface bridge 206, and the device interface 208. The host interface 204 and the device interface 208 can represent any means of transmitting data between devices. The host interface 204 and the device interface 208 may be a computer bus interface standard or other interface protocol for transferring data between systems or components, such as USB 2.0, USB 3.0, IEEE 1394, Compact Flash, SATA, eSATA, PATA, SCSI, SAS, Fiber Channel, PS/2, serial cable, HDMI, or Ethernet. Other embodiments of the interface 104 may include wireless interfaces, such as IEEE 802.11 protocols, Bluetooth, infrared, cellular, or satellite mobile telecommunication protocols. Hardware necessary to implement the host interface 204 or the device interface 208 may be added to the host 202 and the data storage device 210.

The interface bridge 206 may be any method of connecting the host interface 204 and the device interface 208, such as a male-to-male adapter; an interface protocol adapter such as USB-to-HDMI; a device such as a server, a router, a personal computer, a drive capable of integration into a daisy-chain network arrangement; or any type of network. The interface protocol 206 may function as a wireless-to-wired interface protocol adapter, so that one of the host interface 204 or the device interface 208 may be a wired interface protocol, and the other may be a wireless interface protocol.

The data storage device 210 may contain a memory 214 and an Interface Detection Module (IDM) 212. The memory 214 can be any form of volatile or non-volatile memory capable of storing data, such as flash memory, ROM, RAM, DRAM, SRAM, Solid-State Drive (SSD), HDD, or any combination thereof. Data can be transferred between memory 214 and the host 202 by way of the interfaces 204 and 208, and the interface bridge 206. The IDM 212 can monitor data transfers to or from the memory 214. The IDM 212 may take the form of software, a programmable controller, a circuit, a CPU, or any device or combination of elements capable of receiving and processing information about the data transmission.

The system 200 may function in a manner consistent with the embodiments and examples described elsewhere in the disclosure. As the system 200 may include more than one interface type, embodiments where an interface type is determined based on a characteristic of a data transfer may only determine one of the included interfaces. Determining the interface type based on a data throughput rate, for example, may detect the slowest interface type involved in the system 200. For example, if a system 200 involves a high-speed SATA interface, a SATA-to-USB adapter, and a slower USB 2.0 interface, a determination of interface type based on a data throughput rate may detect a USB 2.0 interface type.

Figure 3:
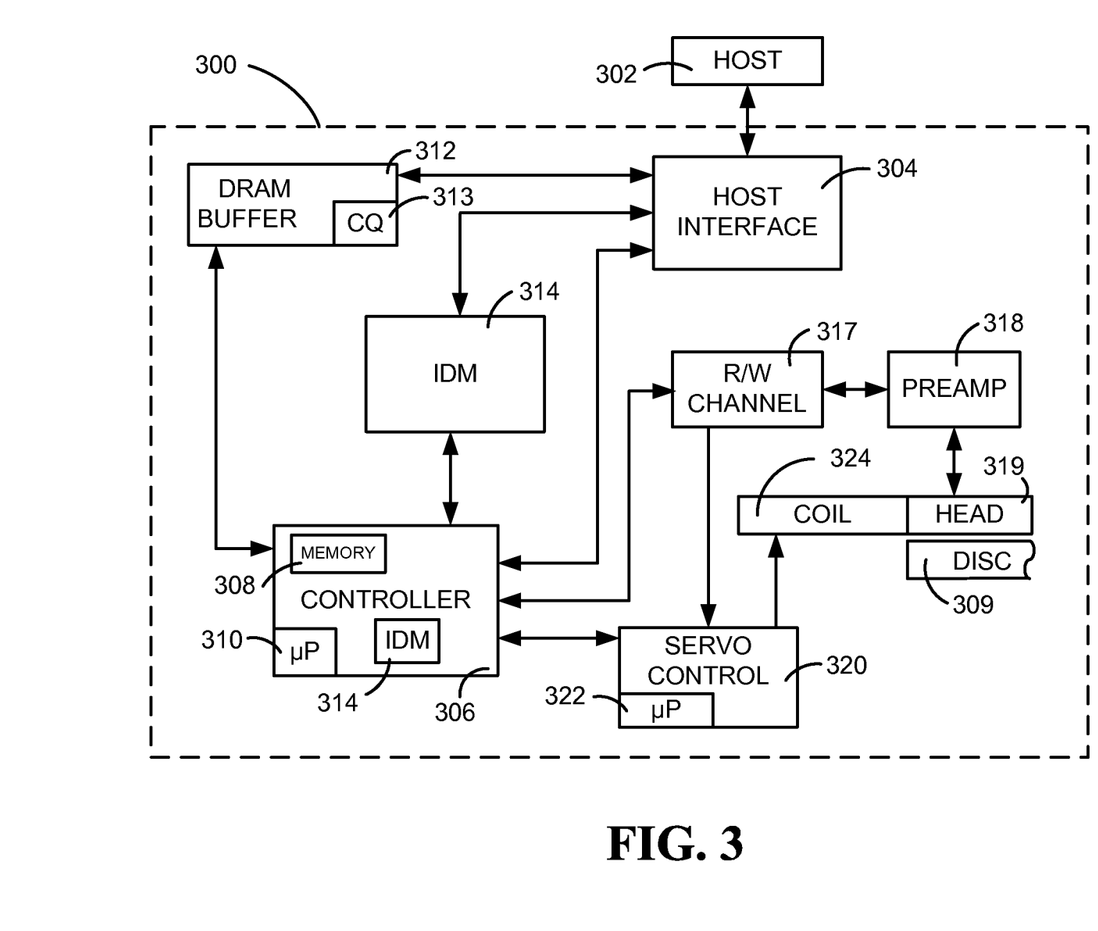
FIG. 3 is an illustrative embodiment of a device for data detection and device optimization.

Referring to FIG. 3, a particular embodiment of a data storage device is shown and generally designated 300. The data storage device 300 may be used as the data storage device 106 shown in FIG. 1 or the data storage device 210 shown in FIG. 2. Specifically, FIG. 3 provides a functional block diagram of a disc drive data storage device. The data storage device 300 can communicate with a host device 302 (such as the host system 102 shown in FIG. 1 or the host system 202 shown in FIG. 2) via a hardware/firmware based interface circuit 304 that may include a connector (not shown) that allows the data storage device 300 to be physically removed from the host 302. The interface circuit 304 may be adapted to communicate or connect with multiple interface protocols, such as USB 2.0, USB 3.0, IEEE 1394, PS/2, SATA, or Bluetooth. The data storage device 300 can include a programmable controller 306 with associated memory 308 and processor 310. The controller may also include an Interface Detection Module (IDM) 314, which may be independent of the controller 306, or part of the controller 306. The buffer 312 can temporarily store user data during read and write operations and can include a command queue (CQ) 313 where multiple pending access operations can be temporarily stored pending execution.

Further, FIG. 3 shows the data storage device 300 can include a read/write (R/W) channel 317 which can encode data during write operations and reconstruct user data retrieved from disc(s) 309 during read operations. A preamplifier/driver circuit (preamp) 318 can apply write currents to the head(s) 319 and provides pre-amplification of readback signals. A servo control circuit 320 may use servo data to provide the appropriate current to the coil 324 to position the head(s) 319. The controller 306 can communicate with a processor 322 to move the head(s) 319 to the desired locations on the disc(s) 309 during execution of various pending commands in the command queue 313.

The IDM 314 of the data storage device 300 may be adapted to monitor data transfers from or to the data storage device 300. The IDM 314 may be adapted to perform all the functions and processes discussed for IDMs elsewhere in the disclosure, for example determining a characteristic of a data transfer, selecting an optimization profile based on the characteristic, and implementing an optimization profile. In some embodiments, a determined characteristic may be the data throughput rate of the transfer. Further, the data throughput rate may be used to determine the interface type operably connected to or communicating with the interface circuit 304.

After an optimization profile is determined, the IDM 314 may instruct or operate with the controller 306 to implement an optimization profile for the data storage device 300 or the host 302. The optimization profile may include the operating modes discussed elsewhere in the specification, or other operating modes for improving the performance of the data storage device 300 or the host 302.

Figure 4:
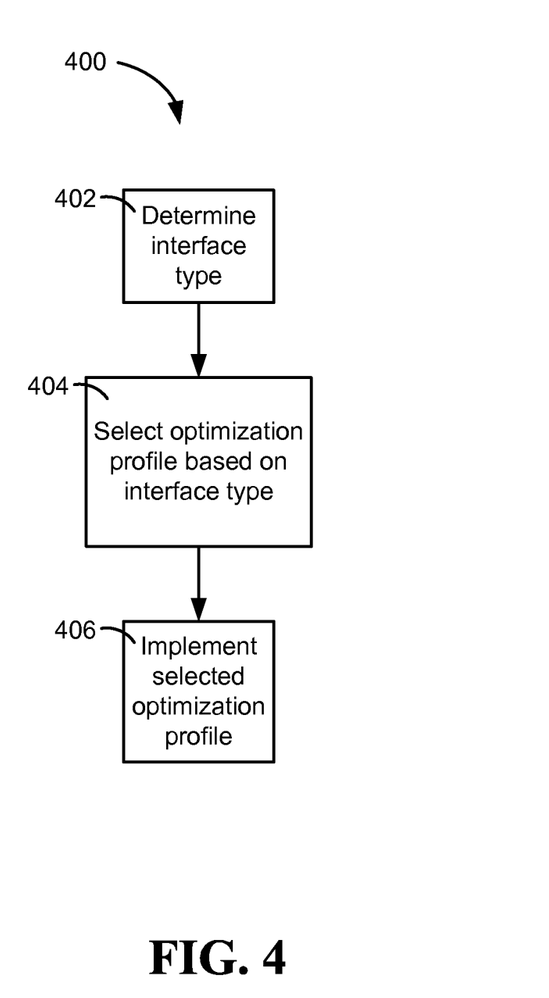
FIG. 4 is a flowchart of an illustrative embodiment of a method for data detection and device optimization.

Referring to FIG. 4, a flowchart of an illustrative embodiment of a method 400 for data detection and device optimization is shown. The method 400 can include determining an interface type used in a data transmission, at 402. The method 400 may also select an optimization profile based upon the determined interface type, at 404. The method 400 may further implement the optimization profile, at 406. A device implementing the method 400 may thereby effect a possible change in operating behavior based on the characteristics, optimizations, or limitations of the interface type.

Figure 5:
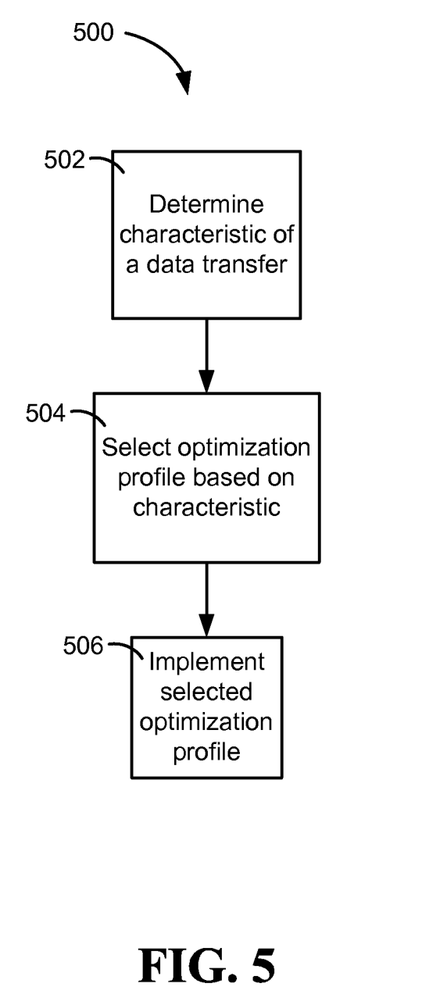
FIG. 5 is a flowchart of an illustrative embodiment of a method for data detection and device optimization.

Referring to FIG. 5, a flowchart of an illustrative embodiment of a method 500 for data detection and device optimization is shown. The method 500 may include determining a characteristic of a data transfer, at 502. The characteristic may be an interface type, or may be another characteristic, such as data throughput rate, connection strength, or interface reliability. In a particular embodiment, multiple characteristics may be determined for any given data transfer. The method 500 may also select an optimization profile based upon the determined characteristic(s), at 504. Once an optimization profile is selected, the method 500 may implement the optimization profile.

Figure 6:
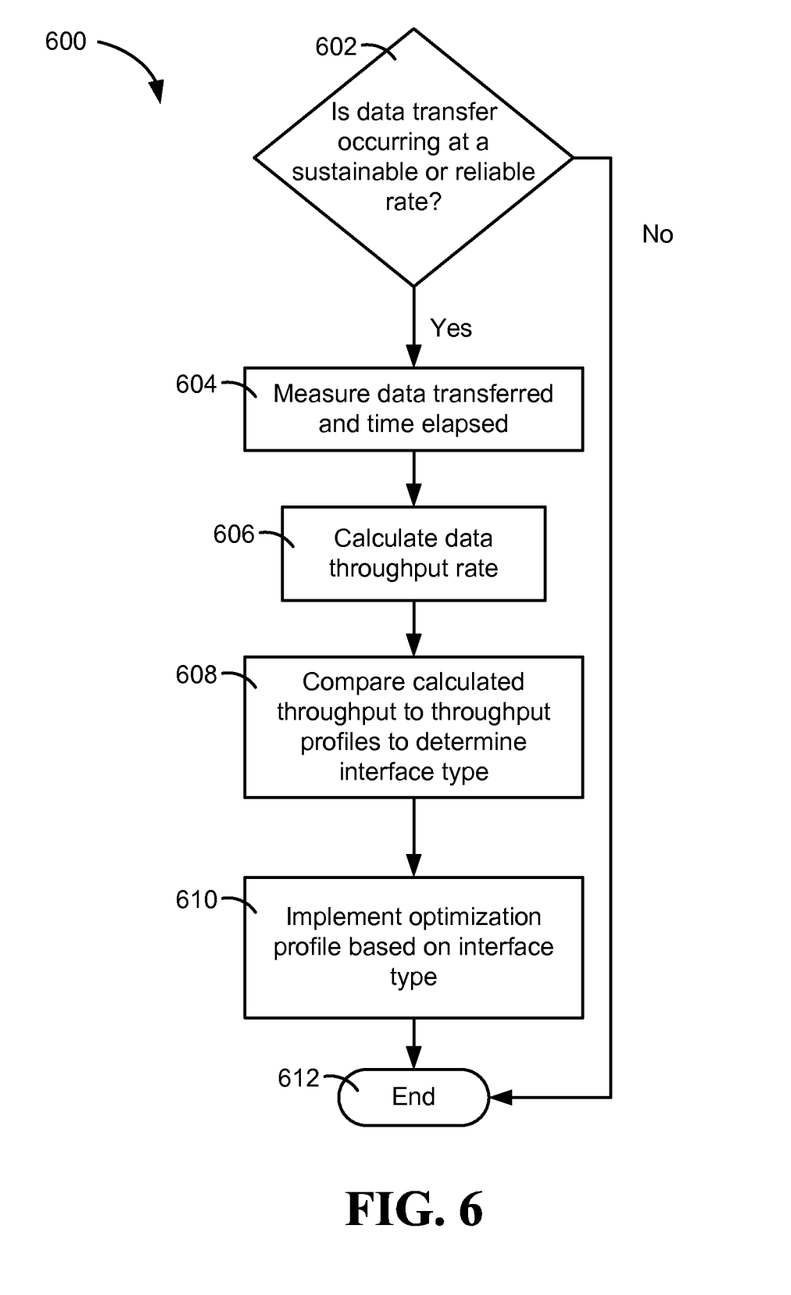
FIG. 6 is a flowchart of an illustrative embodiment of a method for data detection and device optimization.

Referring to FIG. 6, a flowchart of an illustrative embodiment of a method 600 for data detection and device optimization is shown. The method 600 may include determining whether a given data transfer is occurring at an approximately steady rate, at 602. An example of an approximately steady data transfer rate may be a sequential read or sequential write to a data storage device, which occurs at an approximately consistent speed. A device capable of making the determination, at 602, may be able to determine an interface type and data throughput rate more accurately than by measuring random or burst data transmissions. In such embodiments, a determination that the data transfer is occurring at a sporadic or unreliable rate may end the analysis of the data transfer, at 612.

The determination, at 602, may be initiated or repeated according to a variety of factors, such as a set length of time, when a new interface is connected, user-initiated, upon detection of a new data transfer, at power down or power up, according to instructions from a host or other device, at random intervals, after a pre-determined quantity of data has been transferred, or any combination thereof.

The method 600 may also include measuring the amount of data transferred and the time elapsed, at 604. The amount of data transferred can be a value representing the quantity of data transferred during a measured data transfer. The time elapsed can be a value representing an amount of time elapsed during a measured data transfer. In one embodiment, a data transferred value and a time elapsed value may include data transferred and time elapsed from the beginning of a data transfer. In another embodiment, a data transferred value and a time elapsed value may include data transferred and time elapsed from the point that an approximately steady transfer rate is determined, at 602. In some embodiments, a data transferred value and a time elapsed value may be compiled over multiple data transfers, such as by adding the values for the transfers, or by computing an average.

The method 600 may also include calculating a data throughput rate, at 606. A data throughput rate may be calculated with the equation, $$\text{data throughput rate} = \text{data transferred value}/\text{time elapsed value},$$

utilizing the data transferred value and time elapsed value for a data transfer. In one embodiment, a data throughput rate may be determined after a certain quantity of data is transferred or a certain length of time has elapsed in a measured data transfer. For example, the data throughput rate may be determined after 10 MB have been transferred, or after 5 seconds have elapsed. In another embodiment, the data throughput rate may be calculated and updated dynamically. For example, the data throughput rate may be updated every 10 seconds.

Once a data throughput rate has been calculated, the method 600 may compare the data throughput rate to data throughput profiles for interface types, at 608. For example, USB 3.0 may include a data throughput range of 35 MB/s to 100 MB/s, while USB 2.0 may include a data throughput range from 19 MB/s to 26 MB/s. By comparing the calculated data throughput rate of the measured data transfer to throughput profiles of interface types, the method 600 may determine the interface type used in the data transfer, or its equivalent. For example, if there is no data throughput profile for an interface type used in a data transfer, the method 600 may determine what interface type has the nearest equivalent data throughput profile, at 608.

In situations where there is more than one interface type used in a data transfer, the method 600 may determine the slowest interface type, at 608. For example, if a data transfer involves a high-speed SATA interface, a SATA-to-USB adapter, and a slower USB 2.0 interface, a determination of interface type based on a data throughput rate may detect a USB 2.0 interface type.

After determining the interface type or its transfer-rate equivalent, at 608, the method 600 may select and implement an optimization profile based on the interface type, at 610. As discussed earlier, an optimization profile may be a set of one or more operating modes for a given device involved in a data transfer, such as a data storage device or host system. An optimization profile may be selected to improve the performance or efficiency of a device in relation to the determined interface type or transfer-rate equivalent.

The method 600 may then terminate at 612. However, the determination, at 602, may be initiated or repeated based on a variety of factors, such as a set length of time, when a new interface is connected, user-initiated, upon detection of a new data transfer, at power down or power up, according to instructions from a host or other device, at random intervals, after a pre-determined quantity of data has been transferred, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
    a data storage device with a memory and an interface connector that is connectable to and removable from a host computer, the data storage device including:
        a data storage controller including a processor, the data storage controller configured to store data to and retrieve data from the memory;
        an interface circuit coupled to the interface connector and adapted to communicate via multiple interface protocols which define standards for transferring data between devices; and
        an interface detection module adapted to:
            determine a characteristic including a data throughput rate of a data transfer from the host over the interface circuit;
            detect an interface protocol employed in the data transfer based on the characteristic by comparing a value of the characteristic to characteristic values that the multiple interface protocols exhibit; and
            implement an optimization profile for the data storage device based on the interface protocol, the optimization profile including selecting at least one of multiple operating modes of the data storage device and at least one of the multiple operating modes includes optimizing power consumption by reducing processing speed of the processor.

2. The device of claim 1 wherein the interface detection module is further adapted to:
    determine whether the data transfer exibits approximately consistent speed;
    determine the data throughput rate when the data transfer exhibits approximately consistent speed; and
    do not determine the data throughput rate when the data transfer does not exhibit approximately consistent speed.

3. The device of claim 1 wherein the interface detection module dynamically determines the characteristic and updates the optimization profile based on changes in the characteristic.

4. The device of claim 1 further comprising a rotatable data storage medium and a read/write head, wherein at least one of the multiple operating modes includes reducing a seek speed of the read/write head.

5. The device of claim 1 wherein the optimization profile comprises optimizing memory access speed.

6. The device of claim 1 wherein at least one of the multiple operating modes includes increasing a number of memory access retries.

7. The device of claim 1 wherein at least one of the multiple operating modes includes improving reliability by increasing an amount of read-after-write verification.

8. The device of claim 1 wherein the optimization profile comprises optimizing a memory caching scheme.

9. The device of claim 1 wherein the optimization profile comprises optimizing power consumption, optimizing memory access speed, optimizing memory access retry and recovery, optimizing memory reliability, and optimizing a memory caching scheme.

10. The device of claim 1 wherein at least one of the multiple operating modes includes increasing a frequency diagnostics with Directed Offline Scans (DOS) are performed.

11. The device of claim 1 further comprising the interface detection module adapted to determine the interface type based on a comparison of the characteristic to example values for a plurality of interface protocols.

12. A device comprising:
    a data storage controller including a processor, the controller configured to manage data storage operations to a nonvolatile memory of the data storage device;

a circuit configured to:
- detect a data throughput rate of a data transfer over an interface circuit adapted to communicate via multiple interface protocols with one or more host devices;
- determine an interface protocol in use for the data transfer based on the data throughput rate; and
- select an optimization profile based on the interface protocol, the optimization profile including selecting at least one of multiple operating modes of the data storage device and at least one of the multiple operating modes includes reducing processing speed of the processor.

13. The device of claim 12 wherein the circuit dynamically determines the data throughput rate and dynamically updates the optimization profile based on changes in the data throughput rate .

14. The device of claim 12 wherein an interface type is determined by comparing the data throughput rate to values associated with interface protocols.

15. The device of claim 12 further comprising the circuit configured to determine the interface protocol by comparing the detected characteristic to characteristic ranges for possible interface protocols.

16. A method comprising:
- determining a data throughput rate of a data transfer between a host system and a data storage device over an interface;
- determining an interface type and an associated first interface protocol based on the data throughput rate; and
- implementing an optimization profile for the data storage device based on the interface type and the associated first interface protocol, the optimization profile different from the first interface protocol; and
- selecting at least one of multiple operating modes of the data storage device that includes reducing processing speed of a processor of the data storage device.

17. The method of claim 16 further comprising dynamically determining the data throughput rate and adjusting the optimization profile based on the determined data throughput rate.

18. The method of claim 16 wherein the interface type is determined by comparing the data throughput rate to predetermined ranges of rates associated with interface protocols.

19. The method of claim 18 further comprising verifying that the data transfer is characterized by an approximately steady speed.

* * * * *